United States Patent
Weder

(10) Patent No.: US 6,598,342 B2
(45) Date of Patent: *Jul. 29, 2003

(54) DECORATIVE ASSEMBLY FOR A FLORAL GROUPING

(75) Inventor: Donald E. Weder, Highland, IL (US)

(73) Assignee: Southpac Trust International, Inc., Rarotonga Cook Island ( * ) Notice: Subject to any disclaimer, the term of this patent is extended or adjusted under 35 U.S.C. 154(b) by 0 days.

This patent is subject to a terminal disclaimer.

(21) Appl. No.: 10/158,242

(22) Filed: May 28, 2002

(65) Prior Publication Data

US 2003/0005628 A1 Jan. 9, 2003

Related U.S. Application Data

(60) Continuation-in-part of application No. 09/918,320, filed on Jul. 30, 2001, now Pat. No. 6,453,612, which is a continuation of application No. 09/576,789, filed on May 23, 2000, now abandoned, which is a division of application No. 09/333,333, filed on Jun. 15, 1999, now Pat. No. 6,082,045, which is a division of application No. 08/827,852, filed on Apr. 11, 1997, now Pat. No. 5,937,576.

(51) Int. Cl.⁷ ................................................. A01G 9/02
(52) U.S. Cl. .......................................................... 47/72
(58) Field of Search ............................................. 47/72

(56) References Cited

U.S. PATENT DOCUMENTS

| | | |
|---|---|---|
| 797,175 A | 8/1905 | Collenburg et al. |
| 1,206,708 A | 11/1916 | Hutchins |
| 1,446,563 A | 2/1923 | Hughes |
| 1,490,026 A | 4/1924 | Richards |
| 1,610,652 A | 12/1926 | Bouchard |
| 1,697,751 A | 1/1929 | Blake |
| 1,704,801 A | 3/1929 | Miller |
| 1,964,887 A | 7/1934 | Lovett, Jr. |

(List continued on next page.)

FOREIGN PATENT DOCUMENTS

| | | |
|---|---|---|
| CH | 560532 | 4/1975 |
| DE | 345464 | 12/1921 |
| DE | 513971 | 12/1930 |

(List continued on next page.)

OTHER PUBLICATIONS

"Target Halloween Sales With Highlander", Brochure, Highland Supply corporation, 1992.

"Speed Sheets and Speed Rolls", Brochure, Highland Supply Corporation, 1991, 2 pages.

"The Simple Solution For Those Peak Volume Periods", Highland Supply Corporation, 1989, 6 pages.

"Cellocoup—It's A Wrap", The John Henry Company, 1992, 4 pages.

"A World Of Cut Flowers And Pot Plant Packaging", Brochure, Klerk's Plastic Products Manufacturing, Inc., D Date Unknown, 6 pages. Applicaant admits that the products described in this brochure have been on sale at least more than one year prior to the filing of the present patent application.

"Color Them Happy With Highland Products", 1992, 2 pages.

Primary Examiner—Charles T. Jordan
Assistant Examiner—Francis T. Palo
(74) Attorney, Agent, or Firm—Dunlap, Codding & Rogers, P.C.

(57) ABSTRACT

A decorative assembly for supporting a floral grouping utilizes a shape sustaining floral holding material, a sheet of material and a band. The decorative assembly is formed by a method which includes the steps of forming the sheet of material about at least a portion of the floral holding material with a forming device such that an upper end of the floral holding material remains substantially uncovered, and thereafter securing the sheet of material about the floral holding material with a band.

28 Claims, 7 Drawing Sheets

U.S. PATENT DOCUMENTS

| | | | |
|---|---|---|---|
| 1,988,886 | A | 1/1935 | Wilson |
| 1,994,962 | A | 3/1935 | Rushfeldt |
| 2,023,782 | A | 12/1935 | Driver |
| 2,062,410 | A | 12/1936 | Garcia |
| 2,152,648 | A | 4/1939 | Jones |
| 2,209,778 | A | 7/1940 | Krasowski |
| 2,218,293 | A | 10/1940 | Muller |
| 2,274,526 | A | 2/1942 | Bunn |
| 2,302,259 | A | 11/1942 | Rothfuss |
| 2,510,438 | A | 7/1950 | Doolittle |
| 2,540,707 | A | 2/1951 | Beukelman |
| 2,774,187 | A | 12/1956 | Smithers |
| 2,850,842 | A | 9/1958 | Eubank, Jr. |
| 2,989,828 | A | 6/1961 | Warp |
| 3,022,605 | A | 2/1962 | Reynolds |
| 3,073,062 | A | 1/1963 | Hoffman |
| 3,271,922 | A | 9/1966 | Wallerstein et al. |
| 3,316,675 | A | 5/1967 | Cartwright, Jr. |
| 3,376,666 | A | 4/1968 | Leonard |
| 3,431,706 | A | 3/1969 | Stuck |
| 3,531,910 | A | 10/1970 | Snead |
| 3,554,434 | A | 1/1971 | Anderson |
| 3,556,389 | A | 1/1971 | Gregoire |
| 3,748,781 | A | 7/1973 | Erling |
| 3,869,828 | A | 3/1975 | Matsumoto |
| 3,962,503 | A | 6/1976 | Crawford |
| 4,006,561 | A | 2/1977 | Thoma et al. |
| 4,091,925 | A | 5/1978 | Griffo et al. |
| 4,109,442 | A | 8/1978 | Maasbach |
| 4,118,890 | A | 10/1978 | Shore |
| 4,189,868 | A | 2/1980 | Tymchuck et al. |
| 4,216,620 | A | 8/1980 | Weder et al. |
| 4,280,314 | A | 7/1981 | Stuck |
| 4,300,312 | A | 11/1981 | Weder et al. |
| 4,333,267 | A | 6/1982 | Witte |
| 4,400,910 | A | 8/1983 | Koudstaal et al. |
| 4,413,725 | A | 11/1983 | Bruno et al. |
| 4,621,733 | A | 11/1986 | Harris |
| 4,646,470 | A | 3/1987 | Maggio |
| 4,733,521 | A | 3/1988 | Weder et al. |
| 4,773,182 | A | 9/1988 | Weder et al. |
| 4,801,014 | A | 1/1989 | Meadows |
| 4,835,834 | A | 6/1989 | Weder |
| 4,885,898 | A | 12/1989 | Khurgin |
| 4,901,423 | A | 2/1990 | Weder |
| 4,910,913 | A | 3/1990 | Streeter |
| 4,941,572 | A | 7/1990 | Harris |
| 5,077,937 | A | 1/1992 | Weder et al. |
| 5,085,003 | A | 2/1992 | Garcia |
| 5,106,662 | A | 4/1992 | Khayat |
| 5,111,638 | A | 5/1992 | Weder |
| 5,120,382 | A | 6/1992 | Weder |
| 5,181,364 | A | 1/1993 | Weder |
| 5,228,234 | A | 7/1993 | de Klerk et al. |
| 5,231,794 | A | 8/1993 | Weder et al. |
| 5,235,782 | A | 8/1993 | Landau |
| 5,239,775 | A | 8/1993 | Landau |
| 5,249,407 | A | 10/1993 | Stuck |
| 5,339,601 | A | 8/1994 | Weder et al. |
| 5,410,856 | A | 5/1995 | Weder et al. |
| 5,473,858 | A | 12/1995 | Hayes |
| 5,522,202 | A * | 6/1996 | Weder et al. .................. 53/397 |
| 5,595,298 | A | 1/1997 | Straeter |
| 5,623,807 | A * | 4/1997 | Weder et al. .................. 53/399 |
| 5,636,502 | A | 6/1997 | Weder et al. |
| 5,937,576 | A * | 8/1999 | Weder et al. .................. 47/72 |

FOREIGN PATENT DOCUMENTS

| | | |
|---|---|---|
| DE | 1166692 | 3/1964 |
| DE | 2948265 | 5/1981 |
| DE | 8905250 | 10/1989 |
| DE | 41312 | 10/2000 |
| EP | 0163453 | 12/1985 |
| FR | 1084888 | 1/1955 |
| FR | 1393725 | 2/1965 |
| FR | 2036163 | 12/1970 |
| FR | 2272914 | 12/1975 |
| FR | 2619698 | 3/1989 |
| FR | 2651663 | 3/1991 |
| FR | 2734464 | 5/1995 |
| GB | 15550 | 7/1899 |
| GB | 28322 | 12/1907 |
| GB | 1204647 | 9/1970 |
| WO | 9009924 | 9/1990 |
| WO | 9637133 | 11/1996 |

* cited by examiner

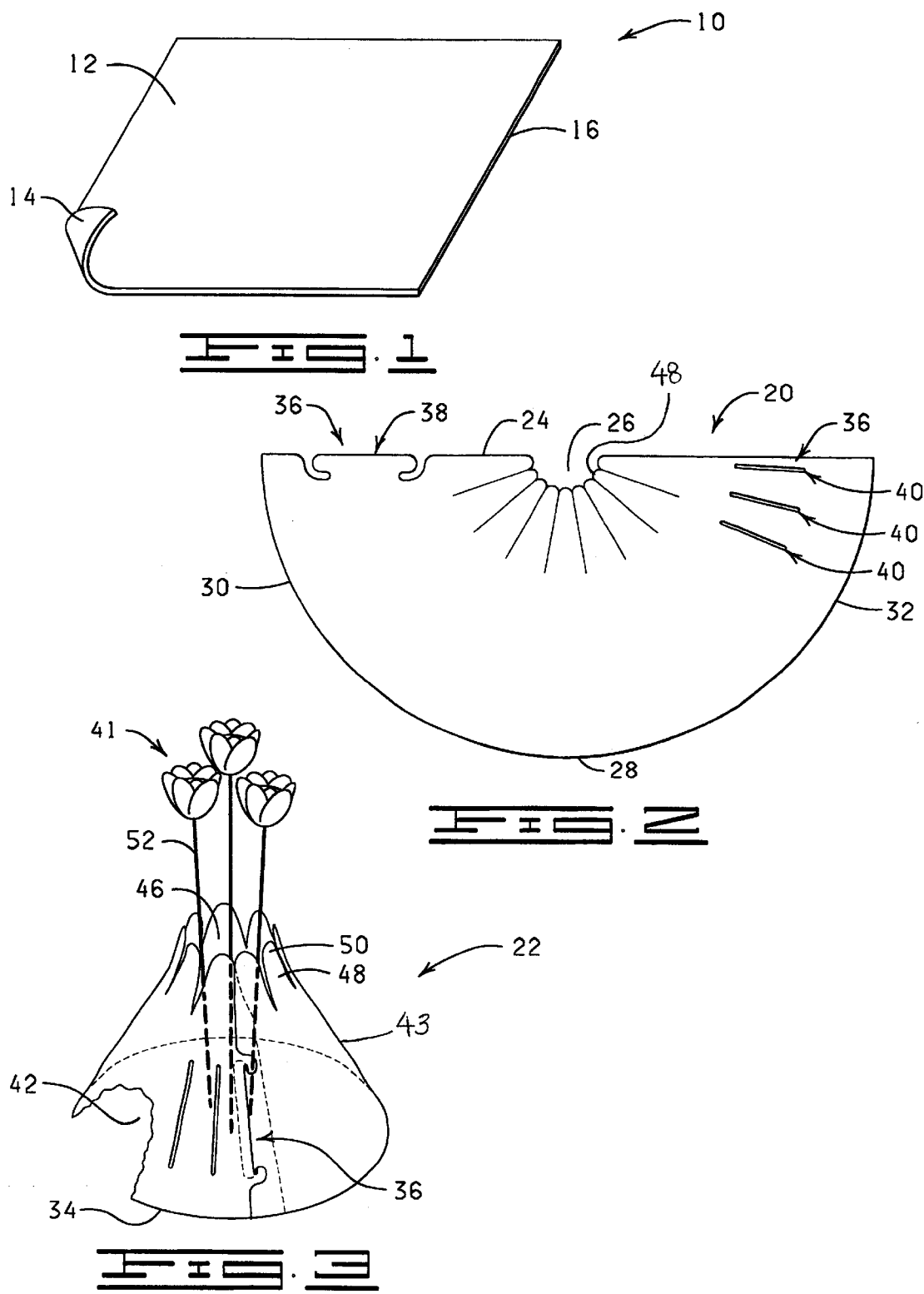

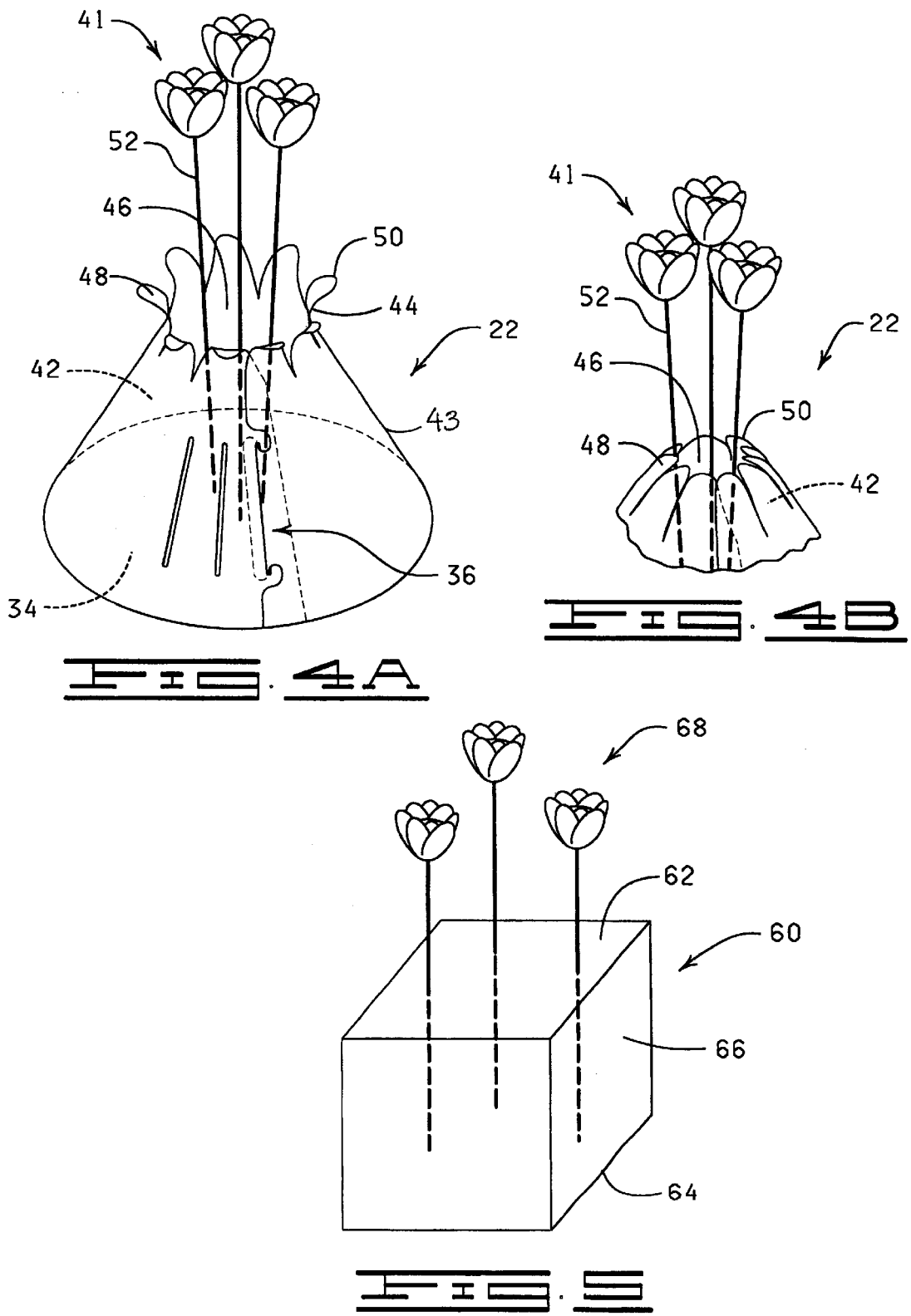

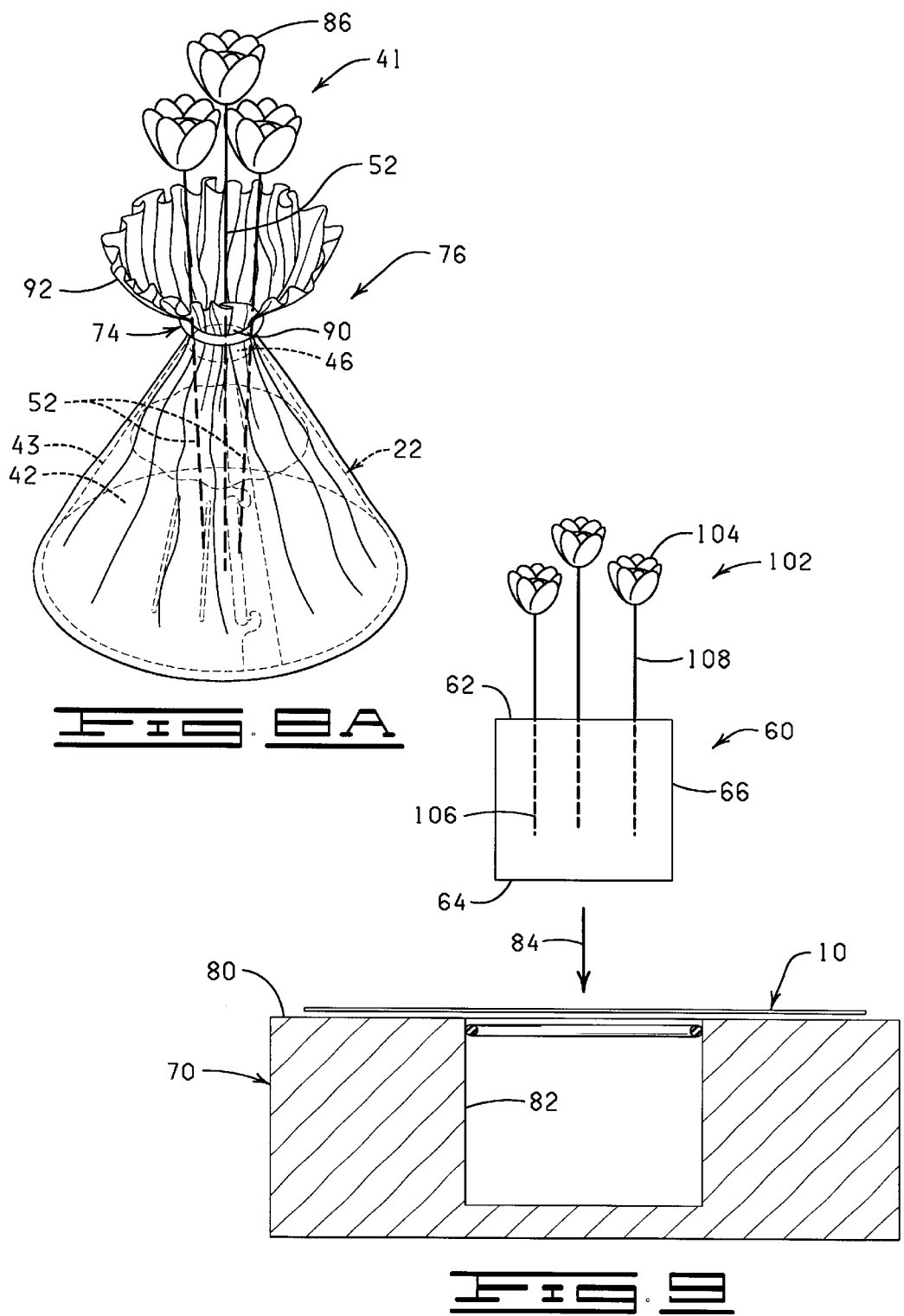

DECORATIVE ASSEMBLY FOR A FLORAL GROUPING

CROSS REFERENCE TO RELATED APPLICATIONS

This application is a continuation-in-part of application U.S. Ser. No. 09/918,320, filed Jul. 30, 2001, now U.S. Pat. No. 6,453,612, issued Sep. 24, 2002; which is a continuation of U.S. Ser. No. 09/576,789, filed May 23, 2000, now abandoned; which is a divisional of U.S. Ser. No. 09/333,333, filed Jun. 15, 1999, now U.S. Pat. No. 6,082,045; which is a divisional of U.S. Ser. No. 08/827,852, filed Apr. 11, 1997, now U.S. Pat. No. 5,937,576.

STATEMENT REGARDING FEDERALLY SPONSORED RESEARCH OR DEVELOPMENT

Not Applicable.

FIELD OF THE INVENTION

The present invention relates generally to decorative assemblies for floral groupings and, more particularly, but not by way of limitation, to decorative assemblies for floral groupings formed by a method wherein a sheet of material is formed about at least a portion of an outer peripheral surface of a floral holding material and secured thereabout with a band.

BRIEF DESCRIPTION OF THE DRAWINGS

FIG. 1 is a pictorial perspective representation of a sheet of material employed in the construction of a decorative assembly for a floral grouping constructed in accordance with the present invention, the sheet of material having a corner upwardly turned to show a lower surface thereof.

FIG. 2 is a diagrammatic plan view illustrating a sheet of flexible material employed in the formation of a floral holding material of the decorative assembly of the present invention, the sheet of flexible material depicted in an unassembled, flattened condition.

FIG. 3 is a partially cutaway, diagrammatic perspective representation of a floral holding material formed from the sheet of flexible material of FIG. 2, wherein a floral grouping is disposed in the floral holding material.

FIG. 4A is a diagrammatic perspective representation of a floral holding material formed from the sheet of flexible material of FIG. 2 wherein an upper portion of the floral holding material is outwardly flared, and wherein a floral grouping is disposed in the floral holding material.

FIG. 4B is a partial, diagrammatic perspective representation of the floral holding material formed from the sheet of flexible material of FIG. 2 wherein the upper portion of the floral holding material is disposed in an inwardly direction, and wherein a floral grouping is disposed in the floral holding material.

FIG. 5 is a diagrammatic perspective representation of another embodiment of a floral holding material employed in the formation of a decorative assembly of the present invention, wherein a floral grouping is disposed in the floral holding material.

FIGS. 8 and 8A are diagrammatic perspective representations of a decorative assembly for a floral grouping constructed in accordance with the present invention wherein a sheet of material is formed about at least a portion of the peripheral sidewall of the floral holding material of FIG. 3 and secured thereabout with a band.

FIG. 9 is a diagrammatic representation, partially in cross section, illustrating the floral holding material of FIG. 5 generally positioned above a sheet of material which is disposed on a forming device for forming the sheet of material about at least a portion of an outer peripheral surface of the floral holding material.

DESCRIPTION OF THE PREFERRED EMBODIMENTS

Description of FIGS. 1–4

Figure 6:
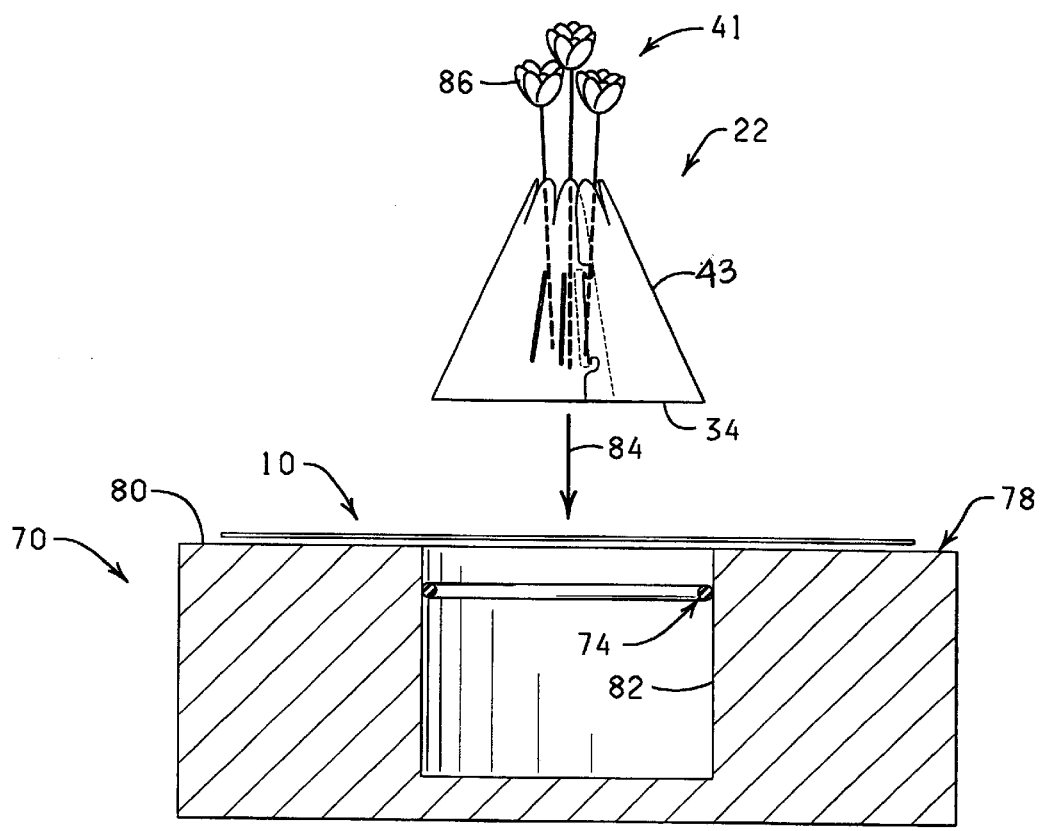
FIG. 6 is a diagrammatic representation, partially in cross section, illustrating the floral holding material of FIG. 3 generally positioned above a sheet of material which is disposed on a forming device for forming the sheet of material about at least a portion of a peripheral sidewall of the floral holding material.

Shown in FIG. 1, and designated by the general reference numeral 10, is a sheet of material employed in the formation of a decorative assembly for a floral grouping in accordance with the present invention. The sheet of material 10, which has an upper surface 12, a lower surface 14 and an outer periphery 16, can be constructed from any suitable flexible material that is capable of being wrapped or formed about a floral holding material to provide a decorative assembly for a floral grouping in the manner described herein after. Preferably, the sheet of material 10 is constructed of paper, metal foil, cloth (natural or synthetic or combinations thereof), denim, burlap, polymeric film, cling material, metallized film, or combinations or laminations thereof.

The term "polymeric film" as used herein means any film made of synthetic or naturally occurring polymers. For example, but not by way of limitation, an example of a synthetic polymeric film is a polypropylene film; and an example of a naturally occurring polymeric film is cellophane.

The sheet of material 10 may be any size and shape so long as the sheet of material 10 can function as described herein, and a substantially square-shape is shown in FIG. 1 only by way of example. The sheet of material 10, for example only, may be circular, rectangular or any other geometric shape, such as heart shaped.

The sheet of material 10 may be constructed of a single layer of material or a plurality of layers of the same or different types of materials. Any thickness of the sheet of material 10 may be utilized in accordance with the present invention as long as the sheet of material 10 is wrappable about floral holding materials as described herein after. Generally, however, the sheet of material 10 will have a thickness in a range of from about 0.1 mil to about 30 mil, and more desirably from about 0.1 mil to about 5 mil. Additionally, an insulating material such as bubble film, preferably as one of two or more layers, can be utilized in order to provide additional protection and/or insulation for the item supported in the floral holding material. The layers of material forming the sheet of material 10 may be connected together or laminated together or may be separate layers.

A decorative pattern, such as a color, an embossed pattern, a printed pattern and/or other decorative surface ornamentation may be applied to at least a portion of at least one of the upper surface 12 and the lower surface 14 of the sheet of material 10 including, but not limited to, printed designs, coatings, colors, flocking or metallic finishes. When the decorative pattern includes both an embossed pattern and a printed pattern, the embossed and printed patterns may be in register with one another, out of register with one another, or partially in register and partially out of register with one another. The sheet of material 10 also may be totally or partially clear or tinted transparent material.

"Cling Wrap or Material" as used herein means any material which is capable of connecting to the sheet of material and/or itself upon contacting engagement during the wrapping process and is wrappable about the decorative assembly formed about the floral holding material whereby portions of the cling material contactingly engage and connect to other portions of the decorative assembly for generally assisting in securing the sheet of material about at least a portion of the floral holding material. This connecting engagement is preferably temporary in that the cling material may be easily removed without tearing the sheet of material, i.e., the cling material "clings" to the sheet of material.

The cling material is constructed and treated if necessary, from polyethylene, such as Cling Wrap made by GLAD®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from about 0.2 mil to about 10 mil, and preferably from about 0.5 mil to about 2.5 mil, and most preferably from about 0.6 mil to about 2 mil. However, any thickness of cling material may be utilized in accordance with the present invention which permits the cling material to function as described herein.

Referring now to FIG. 2, a sheet of flexible material 20 employed in the formation of a floral holding material 22 (FIGS. 3, 4A and 4B) is illustrated. The floral holding material 22 is illustrated as having a substantially conically-shaped configuration. However, it should be understood that the floral holding material 22 can have any desirable configuration, such as a tubular or square-shaped configuration, as long as such configuration provides the desired properties to permit same to function as the floral holding material 22.

The sheet of flexible material 20 possesses sufficient flexibility to permit the sheet of flexible material 20 to be formed into the floral holding material 22, while having sufficient strength to provide the floral holding material 22 with required shape-sustaining properties. Thus, the thickness of the sheet of flexible material 20 can vary widely, the only requirements being that the sheet of flexible material 20 have sufficient flexibility and strength to satisfy the above-stated requirements. For reasons which will be herein after described, it may be desirable that the sheet of flexible material 20 be constructed of a sufficiently water resistant material to prevent deterioration of the floral holding material 22 when the floral holding material 22 is contacted with a fluid, such as water. Materials possessing the above-identified properties which may be used as the sheet of flexible material 20 for fabrication of the floral holding material 22 are polymeric materials, metals, cardboard, water-repellent cardboard, poster board, corrugated materials, combinations thereof and the like.

While the sheet of flexible material 20 has been shown as an individual sheet of material, it should be understood that sheets of flexible material 20 can be stacked so that each individual sheet of flexible material 20 can be removed from the stack and shaped into the desired configuration of the floral holding material 22; or, the sheets of flexible material 20 can be in the form of a roll of material in which perforations outline the configuration of each sheet of flexible material 20.

The sheet of flexible material 20 has an upper side 24 having a centrally disposed recess 26, a lower side 28, a first end portion 30 and a second end portion 32 which cooperate to provide the sheet of flexible material 20 with a substantially semi-circular configuration. If desired, a substantially circular-shaped base member (not shown) can be connected to the lower side 28 of the sheet of flexible material 20 substantially as shown and described in U.S. Pat. No. 6,082,045, issued to Weder et al on Jul. 4, 200, the contents of which are hereby expressly incorporated herein by reference in their entirety. When the sheet of flexible material 20 is provided with a base member, the base member serves to close an open lower end 34 (FIGS. 3 and 4A) of the floral holding material 22 formed from the sheet of flexible material 20.

To stabilize the floral holding material 22 in its desired configuration, the sheet of flexible material 20 can further be provided with a connector assembly 36 for connecting the first end portion 30 of the sheet of flexible material 20 to the second end portion 32 of the sheet of flexible material 20 when the sheet of flexible material 20 is formed into the floral holding material 22 substantially as shown in FIGS. 3, 4A and 4B. The connector assembly 36 comprises a male connector 38 and a plurality of female connectors 40. The male connector 38 is disposed along the upper side 24 of the sheet of flexible material 20 near the first end portion 30 thereof; and the plurality of female connectors 40 are spatially disposed in the second end portion 32 of the sheet of flexible material 20 near the upper side 24 thereof such that at least one female connector 40 is adapted to matingly engage the male connector 38 and thereby connect the first end portion 30 of the sheet of flexible material 20 to the second end portion 32 of the sheet of flexible material 20. The male connector 38 is illustrated in FIG. 2 as a tab, and the plurality of female connectors 40 are illustrated in FIG. 2 as spatially disposed slits provided in the second end portion 32 of the sheet of flexible material 20 so that each of the female connectors 40 is alignable with the male connector 38 when the first end portion 30 of the sheet of flexible material 20 is disposed over the second end portion 32 of the sheet of flexible material 20 during formation of the floral holding material 22. Thus, upon connecting the male connector 38 with a selected female connector 40, the circumferential dimensions of the floral holding material 22 can be varied.

While the sheet of flexible material 20 has been illustrated as having only one male connector 38, it should be understood that a plurality of male connectors 38 could be disposed along the upper side 24 of the sheet of flexible material 20 near the first end portion 30 thereof for mating engagement with the female connectors 40 formed in the second end portion 32 of the sheet of flexible material 20. Further, the configuration and type of the male connector 38 and the female connector 40 can vary widely, the only requirement being that the male connector 38 be adapted to matingly engage and be connectable to the female connectors 40 so that the first end portion 30 of the sheet of flexible material 20 can be securely connected to the second end portion 32 of the sheet of flexible material 20 so as to form the floral holding material 22.

The floral holding material 22 is designed to support and stabilize a floral grouping 41. As shown in FIG. 3, the floral holding material 22 is provided with an open upper end 46, the open lower end 34 and a peripheral sidewall 43 that defines an internal chamber 42 that extends between the open upper end 46 and the open lower end 34 thereof.

The sheet of flexible material 20 is further provided with a plurality of finger members 48 formed about the centrally disposed recess 26 formed in the upper side 24 of the sheet of flexible material 20 (FIG. 2). The finger members 48, which extend inwardly into the sheet of flexible material 20 from the centrally disposed recess 26, desirably have a rounded or arcuate shaped or substantially flat distal end 50. The finger members 48 enhance the stabilization of the floral grouping 41 disposed in the internal chamber 42 of the floral holding material 22 (FIGS. 3, 4A and 4B). The finger members 48 can be flared outwardly to provide a flared neck portion 44 extending about the open upper end 46 of the floral holding material 22 as shown in FIG. 4A, or the finger members 48 can be pressed inwardly into the open upper end 46 of the floral holding material 22 so as to engage stem portions 52 of the floral grouping 41 disposed within the internal chamber 42 of the floral holding material 22 (FIG. 4B). It should also be understood that when the finger members 48 are flared outwardly as shown in FIG. 4A, the stem portions 52 of the floral grouping 41 can be disposed between adjacently disposed finger members 48 to stabilize the floral grouping 41 in the floral holding material 22 and/or to assist in the arrangement of the floral grouping 41.

Description of FIG. 5

Referring now to FIG. 5, a floral holding material 60 is illustrated. The floral holding material 60 has an upper end 62, a lower end 64 and an outer peripheral surface 66; and the floral holding material 60 is constructed of a material capable of receiving a floral grouping 68 such that the floral grouping 68 is held and supported by the floral holding material 60 without the need of a pot. The floral holding material 60 shown in FIG. 5 has a generally cubical configuration. However, it is to be understood that the floral holding material 60 may have a generally rectangular configuration or may be spherically shaped, semi-spherically shaped, frustum shaped or have any other shape or configuration desired in any particular application.

The floral holding material 60 may be the type of material commonly referred to in the art as floral foam or Oasis™, or may be soil or artificial soil or other earth composition, so long as the material is capable of holding its predetermined shape and capable of receiving and supporting the floral grouping 68 without a pot. The floral holding material 60 may also be capable of receiving and holding water for supplying water to the floral grouping 68 supported therein.

It should be understood that the floral holding materials 22 and 60 hereinbefore described are merely representative of materials that can be used in the practice of the present invention and that the term "floral holding material" as used herein encompasses any type of material that is capable of holding its predetermined shape and capable of receiving and supporting a floral grouping without a pot. In addition, such materials are desirably capable of receiving and holding water for supplying water to the floral grouping supported therein.

Figure 7:
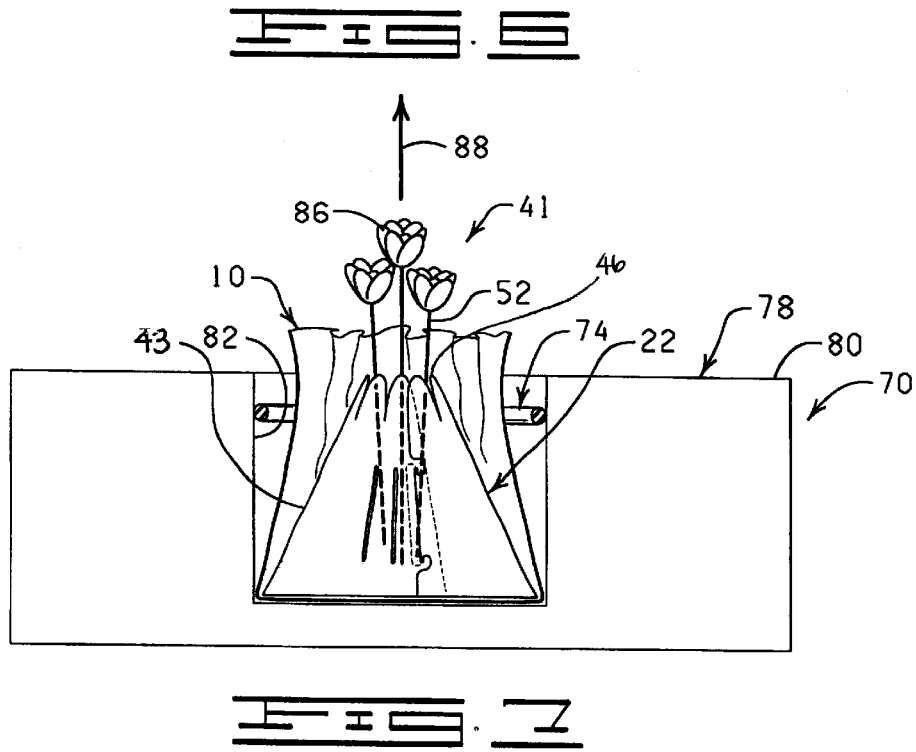
FIGS. 7 and 7A are diagrammatic representations, partially in cross section, illustrating the floral holding material of FIG. 3 generally positioned in an opening of the forming device of FIG. 6 prior to positioning a band about a portion of the sheet of material to secure same about the floral holding material.
Figure 8:
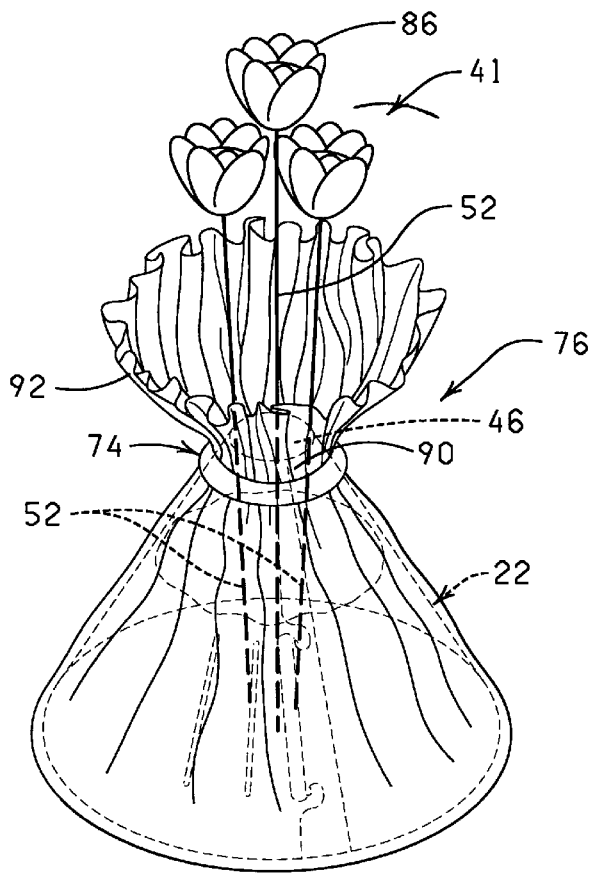

Description of FIGS. 6–8

Referring now to FIGS. 6 and 7 and designated by the general reference numeral 70 is a forming device used to form the sheet of material 10 about at least a portion of the peripheral sidewall 43 of the floral holding material 22 and to maintain the sheet of material 10 about at least a portion of the peripheral sidewall 43 of the floral holding material 22 during application of a band 74 so as to provide a decorative assembly 76 for a floral grouping (FIG. 8). The forming device 70 includes a platform 78 having an upper support surface 80 and an opening 82 extending through a portion of the upper support surface 80, the opening 82 being sized and configured to permit at least a portion of the floral holding material 22 and the sheet of material 10 to be positioned there through.

As more clearly shown in FIG. 6, the sheet of material 10 is placed on the upper support surface 80 of the platform 78 and positioned so that the sheet of material 10 generally is centered over the opening 82 in the platform 78. The floral holding material 22 then is positioned generally above the opening 82 in the platform 78 and above the sheet of material 10. The floral holding material 22 then is moved in a downwardly direction 84 to a position wherein the open lower end 34 of the floral holding material 22 engages a portion of the sheet of material 10, preferably a central portion of the sheet of material 10. The floral holding material 22 then further is moved in the downwardly direction 84 thereby pushing the floral holding material 22, along with a portion of the sheet of material 10, generally in the downwardly direction 84 and through the opening 82 in the platform 78 of the forming device 70. The floral holding material 22 with the sheet of material 10 formed about at least a portion thereof further is moved in the downwardly direction 84 to position the floral holding material 22 at a predetermined position within the opening 82 in the forming device 70 whereby the sheet of material 10 covers the lower end 34 of the floral holding material 22 and is positioned generally about at least a portion of the peripheral sidewall 43 of the floral holding material 22. In this position, as shown in FIG. 7, the sheet of material 10 extends about and covers a substantial portion of the floral holding material 22, leaving the open upper end 46 of the floral holding material 22 substantially uncovered so that a bloom or flower portion 86 of the floral grouping 41 extends outwardly from the open upper end 46 of the floral holding material 22 (FIG. 8).

Figure 7A:
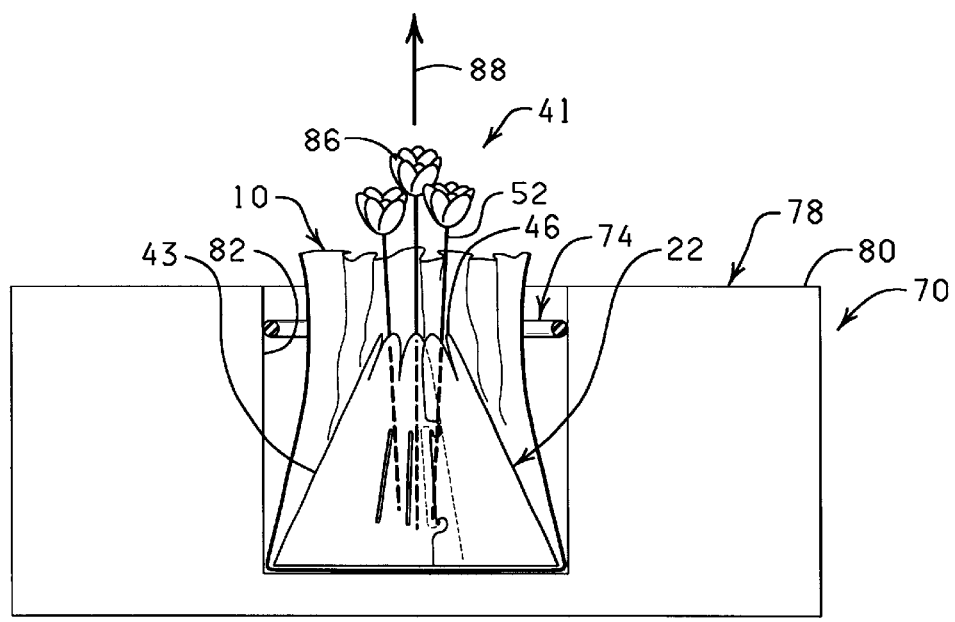

The band 74 is applied about the sheet of material 10 and positioned either around a portion of the floral holding material 22 in close proximity to the open upper end 46 of the floral holding material 22 (FIG. 7) or at a position above the floral holding material 22 (FIG. 7A) so as to provide the decorative assembly 76 for the floral grouping 41 (FIGS. 8 and 8A). That is, the decorative assembly 76 is formed from the sheet of material 10 and the floral holding material 22 wherein the sheet of material 10 formed about at least a portion of the peripheral sidewall 43 of the floral holding material 22 such that the open upper end 46 of the floral holding material 22 remains uncovered by the sheet of material 10. After the band 74 has been applied about the sheet of material 10 disposed about at least a portion of the floral holding material 22, the decorative assembly 76 having the floral grouping 41 supported therein is moved in an upwardly direction 88 (FIG. 7) to remove the same from the forming device 70.

A crimped portion 90 (FIG. 8) is formed in the sheet of material 10 near the open upper end 46 of the floral holding material 22. The crimped portion 90 is formed by crimping together portions of the sheet of material 10 formed about the floral holding material 22. In FIG. 8, the crimped portion 90 is formed below and substantially adjacent the open upper end 46 of the floral holding material 22 by placing the band 74 about a portion of the sheet of material 10 with the band 74 gathering or bringing together portions of the sheet of material 10. However, it is to be understood that the crimped portion 90 could be formed only in portions of the sheet of material 10, thereby forming circumferentially spaced apart crimped portions, if desired in a particular application; or, the crimped portion 90 could be formed above the open upper end 46 of the floral holding material 22 in the same manner as herein after described with reference to the floral holding material 60.

A portion of the sheet of material 10 extends a distance above and beyond the crimped portion 90 to form a skirt 92 (FIG. 8) extending circumferentially about the open upper end 46 of the floral holding material 22 and circumferentially about at least a portion of the stem portion 52 of the floral grouping 41, substantially as shown in FIG. 8.

The term "band" as used herein means any material which may be positioned about the sheet of material 10 to secure the sheet of material 10 about at least a portion of a peripheral sidewall or outer peripheral surface of a floral holding material, such as the peripheral sidewall 43 of the floral holding material 22 and the outer peripheral surface 66 of the floral holding material 60. Thus, the term "band" as used herein refers to elastic bands or rubber bands and includes any other type of material such as string, ribbon, metal, rubber, or plastic which may be used to secure a sheet of material about a floral holding material to provide a decorative assembly for a floral grouping in accordance with the present invention.

The band 74 employed to secure the sheet of material 10 about a floral holding material, such as the floral holding materials 22 and 60, can be applied either manually or automatically. For example, the sheet of material 10 can be placed about the floral holding material 22, and then the floral holding material 22 having the sheet of material 10 formed thereabout can be placed in a banding applicator. Thus, after the floral holding material 22 with the sheet of material 10 extended thereabout is placed in the banding applicator, the operator takes a band and positions it about the sheet of material 10.

Band applicators which may be employed in the practice of the present invention and which are capable of applying a band about the sheet of material 10 to secure the sheet of material 10 about the floral holding material 22 as described herein are commercially available, such as "BandMaster", a band applicator available from Rubber Band Technology Limited of Yakima, Wash.

To automatically band the sheet of material 10 about the floral holding material 22, the floral holding material 22 with the sheet of material 10 extended thereabout is placed in the banding machine and the banding machine is activated to automatically place the band 74 about the sheet of material 10. A system for automatically placing a band about a sheet of material disposed about a flower pot is disclosed in co-pending application U.S. Ser. No. 09/012,907 filed Jan. 23, 1998, entitled "BAND APPLICATOR FOR APPLYING A BAND ABOUT A SHEET OF MATERIAL AND A POT", the disclosure of which is hereby expressly incorporated herein by reference. This system can be utilized for automatically placing the band 74 about the sheet of material 10 in accordance with the present invention.

It should also be understood that the sheet of material 10 can be placed about the floral holding material 22, and then the floral holding material 22 having the sheet of material 10 formed thereabout can be placed in a holding device including a band holder. The floral holding material 22 with the sheet of material 10 extended thereabout is placed in the holding device, and the operator takes a band from the band holder and pulls it over the holding device and onto the sheet of material 10.

As shown in FIG. 8, the floral grouping 41 has the stem portion 52 and the bloom or flower portion 86. A portion of the stem portion 52 of the floral grouping 41 extends into the internal chamber 42 of the floral holding material 22; and the bloom or flower portion 86 of the floral grouping 41 extends a distance above the floral holding material 22.

The term "floral grouping" as used herein means cut fresh flowers, artificial flowers, a single flower, other fresh and/or artificial plants or other floral materials and may include other secondary plants and/or ornamentation which add to the aesthetics of the overall floral grouping.

It is to be understood that while the formation of the decorative assembly 76 about the floral holding material 22 utilizing the sheet of material 10, the forming device 70 and the band 74 has been described above, the same procedures and devices can be employed to form a decorative cover about the floral holding material 60 or any other typical floral holding material.

Figure 10:
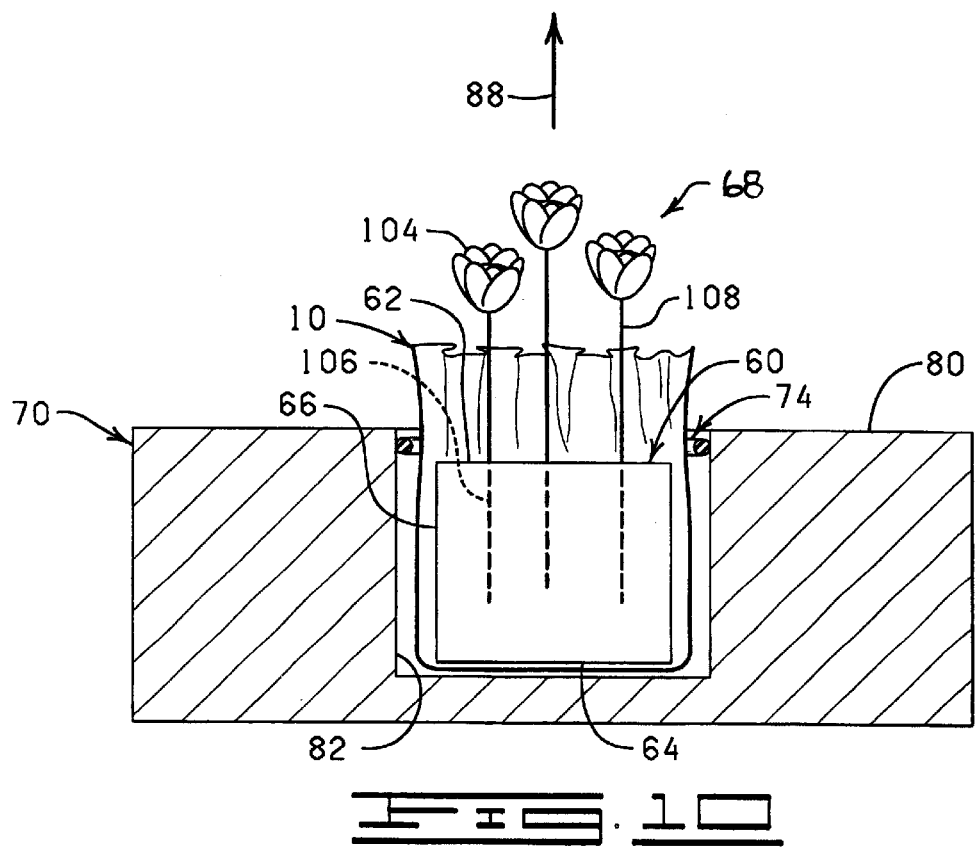
FIG. 10 is a diagrammatic representation, partially in cross section, illustrating the floral holding material of FIG. 5 generally positioned in an opening of the forming device of FIG. 10 prior to positioning a band about a portion of the sheet of material to secure same about the floral holding material.
Figure 11:
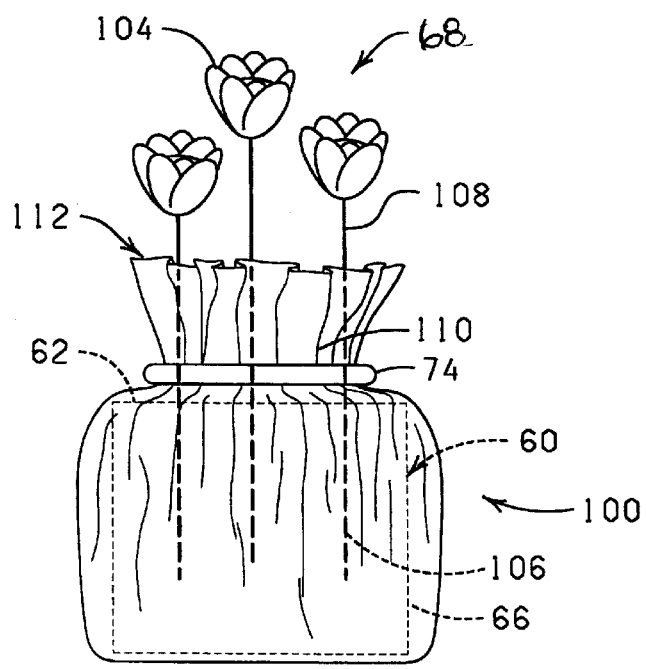
FIG. 11 is a diagrammatic perspective representation of a decorative assembly for a floral grouping constructed in accordance with the present invention wherein a sheet of material is formed about at least a portion of the outer peripheral surface of the floral holding material of FIG. 5 and secured thereabout with a band.

Description of FIGS. 9–11

Referring now to FIGS. 9–11, the formation of a decorative assembly 100 for a floral grouping (FIG. 11) formed about the floral holding material 60 (FIG. 5) utilizing the sheet of material 10 (FIG. 1) and the forming device 70 (as described previously with respect to FIGS. 6 and 7) will now be described. As more clearly shown in FIG. 9, the sheet of material 10 is placed on the upper support surface 80 of the platform 78 of the forming device 70 and positioned so that the sheet of material 10 generally is centered over the opening 82 in the platform 78 of the forming device 70. The floral holding material 60 is then positioned generally above the opening 82 in the platform 78 of the forming device 70 and above the sheet of material 10. The floral holding material 60 then is moved in the downwardly direction 84 to a position wherein the lower end 64 of the floral holding material 60 engages a portion of the sheet of material 10, preferably a central portion of the sheet of material 10. The floral holding material 60 is further moved in the downwardly direction 84, thereby pushing the floral holding material 60, along with a portion of the sheet of material 10, generally in the downwardly direction 84 and through the opening 82 in the platform 78 of the forming device 70 to position the floral holding material 60 at a predetermined position within the opening 82 in the forming device 70 whereby the sheet of material 10 is positioned generally about at least a portion of the outer peripheral surface 66 of the floral holding material 60. In this position, as shown in FIG. 10, the sheet of material 10 extends about and covers a substantial portion of the floral holding material 60, leaving the upper end 62 of the floral holding material 60 substantially uncovered so that a bloom or flower portion 104 of the floral grouping 68 extends outwardly from the upper end 62 of the floral holding material 60; and a lower portion 106 of a stem portion 108 of the floral grouping 68 extends into the floral holding material 60.

As shown in FIG. 11, a crimped portion 110 is formed above the upper end 62 of the floral holding material 60 by placing the band 74 about a portion of the sheet of material 10 with the band 74 gathering or bringing together portions of the sheet of material 10. As shown in FIG. 10, after the band 74 has been applied about the sheet of material 10 disposed about at least a portion of the floral holding material 60, the floral holding material 60 having the sheet of material 10 secured thereabout by the band 74 is moved in the upwardly direction 88 to remove the decorative assembly 100 from the forming device 70.

Alternatively, the sheet of material 10 can be crimped by hand to form the crimped portion 110, and thereafter the band 74, such as a ribbon or string can be tied about the crimped portion 110 so as to provide the decorative assembly 100 for the floral grouping 68. That is, the sheet of material 10 is disposed about at least a portion of the outer peripheral surface 66 of the floral holding material 60 such that at least a portion of the upper end 62 of the floral holding material 60 remains uncovered by the sheet of material 10.

A portion of the sheet of material 10 extends a distance above and beyond the crimped portion 110 and forms a skirt 112 (FIG. 11) extending circumferentially about the upper end 62 of the floral holding material 60 and circumferentially about at least a portion of the floral grouping 68 substantially as shown.

The band 74, as hereinbefore described, can be applied about the sheet of material 10 to secure same about the floral holding material 60 and thereby provide the decorative assembly 100, either automatically utilizing the commercially available automatic or semi-automatic banding machines herein before identified, or manually. Further, the band 74 can be disposed about a portion of the sheet of material 10 extending about the outer peripheral surface 66 of the floral holding material 60; or the band 74 can be applied to a portion of the sheet of material 10 extending above the upper end 62 of the floral holding material 60, when the band 70 is applied about the portion of the sheet of material 10 extending above the upper end 62 of the floral holding material 60, care should be exercised to insure that at least a portion of the upper end 62 of the floral holding material 60 remains uncovered by the sheet of material 10.

Figure 12:
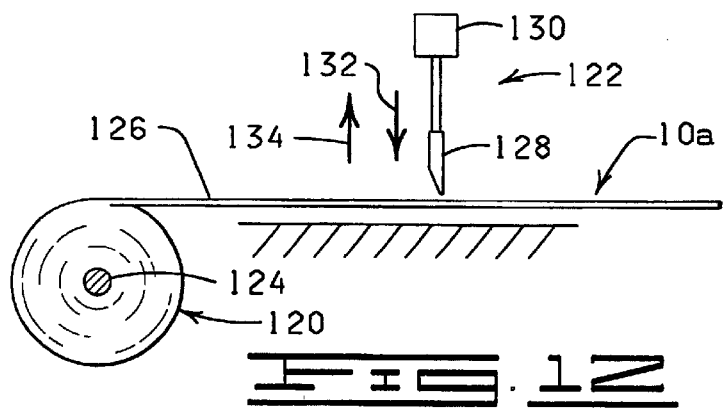
FIG. 12 is a pictorial view of a roll of material and a cutting apparatus for providing sheets of material which can be employed in the production of the decorative assemblies for floral groupings constructed in accordance with the present invention.

Description of FIG. 12

Referring now to FIG. 12, a diagrammatic representation of a roll of material 120 and a cutting apparatus 122 is provided which is capable of providing sheets of material 10a which can be employed in the production of the decorative assemblies for floral groupings constructed in accordance with the present invention. The sheet of material 10a is similar in construction to the sheet of material 10 herein before described in detail with reference to FIG. 1. Thus, no further discussion or characterization of the sheet of material 10a or its use in accordance with the present invention is believed necessary for one skilled in the art to understand and practice the present invention.

The roll of material 120 is supported on a shaft 124 such that material 126 can be withdrawn from the roll of material 120 until a predetermined length of material 126 has been withdrawn. In this position, a portion of the material 126 is disposed under a knife edge 128 of the cutting apparatus 122. The knife edge 128 is connected to an actuator 130 of the cutting apparatus 122 so that the knife edge 128 can be moved in a first direction 132 and a second direction 134 in response to activation of the actuator 130. When the predetermined length of material 126 has been withdrawn from the roll of material 120, the actuator 130 is actuated to move the knife edge 128 in the first direction 132 to a position wherein the knife edge 128 severingly engages the material 126 to cut same from the roll of material 120 and thereby provide the sheet of material 10a. After the knife edge 128 has cuttingly severed the sheet of material 10a from the roll of material 120, the actuator 130 is actuated to move the knife edge 128 in the second direction 134 to a storage position disposed above the material 126. It should be understood that the cutting apparatus 122 may further include a hydraulic or pneumatic cylinder or gear arrangement suitable for moving the knife edge 128 in the first and second direction 132 and 134, respectively.

Figure 13:
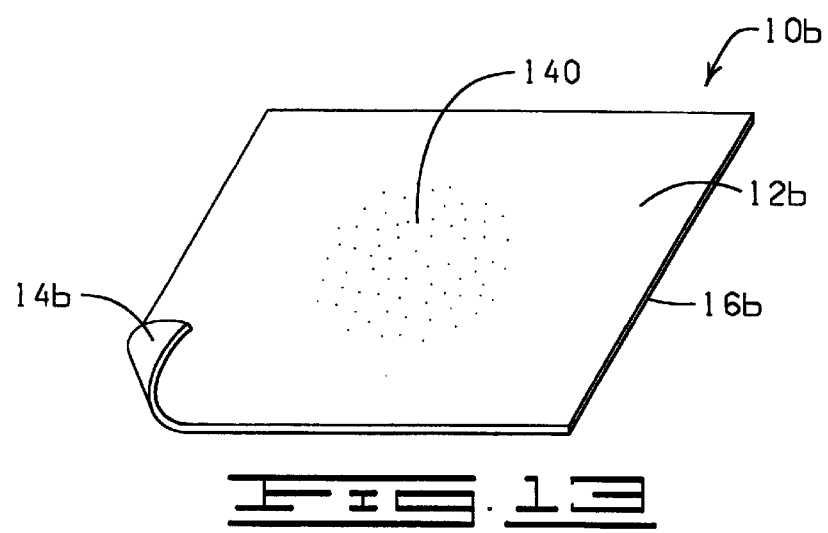
FIG. 13 is pictorial perspective representation of another embodiment of a sheet of material which can be formed about at least a portion of a floral holding material in accordance with the present invention, the sheet of material having a corner upwardly turned to show a lower surface of the sheet of material.

Description of FIG. 13

Referring now to FIG. 13, shown therein is a sheet of material 10b which is similar to the sheet of material 10 shown and described herein before with reference to FIG. 1, except the sheet of material 10b has a bonding material 140 disposed thereon. Thus, the sheet of material 10b has an upper surface 12b, a lower surface 14b, and an outer periphery 16b. The bonding material 140 is disposed on at least a portion of the upper surface 12b of the sheet of material 10b. The bonding material 140 may extend circumferentially about the sheet of material 10b; or, the bonding material 140 may be substantially centrally disposed on the upper surface 12b of the sheet of material 10b; or, a portion of the bonding material 140 may extend circumferentially about the sheet of material 10b and another portion of the bonding material 140 may be substantially centrally disposed on the upper surface 12b of the sheet of material 10b. It should be noted that, although the bonding material 140 may be in the form of spots or spaced apart strips, and the spots or strips may be of any geometric shape desired in a particular application.

The term "bonding material" as used herein means an adhesive, preferably a pressure sensitive adhesive, or a cohesive. Where the bonding material is a cohesive, a similar cohesive material must be placed on the adjacent surface of the floral holding material, such as the floral holding material 22 and 60, for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein.

In operation, the sheet of material 10b is formed about at least a portion of a peripheral sidewall or an outer peripheral surface of a floral holding material in the same manner that the sheet of material is formed about the peripheral sidewall 43 of the floral holding material 22 and the outer peripheral surface 66 of the floral holding material 60 herein before described. However, when the sheet of material 10b is formed about a floral holding material, overlapping portions of the sheet of material 10b, as well as the crimped portion formed in the sheet of material during the formation of the decorative assembly (such as the decorative assemblies 76 and 100 herein before described) are bonded via the bonding material 140.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A decorative assembly for supporting a floral grouping having a stem portion and a bloom portion, the decorative assembly comprising a shape sustaining floral holding material, a sheet of material and a band, the decorative assembly formed by a method comprising the steps of:

providing a shape sustaining floral holding material having an open upper end, a lower end and a peripheral sidewall defining an internal chamber extending between the open upper end and the lower end thereof, the floral holding material having a substantially conically-shaped predetermined configuration and the floral holding material capable of maintaining its predetermined configuration as well as being capable of receiving and supporting the floral grouping;

providing a sheet of material;

providing a forming device adapted to form the sheet of material about the lower end and at least a portion of the peripheral sidewall of the floral holding material;

forming the sheet of material about the lower end and at least a portion of the peripheral sidewall of the floral holding material with the forming device whereby the sheet of material encompasses the lower end and at least a portion of the peripheral sidewall of the floral holding material while leaving the open upper end of the floral holding material substantially uncovered;

providing a band; and positioning the band about the sheet of material while the sheet of material and the floral holding material are maintained within the forming device so as to secure the sheet of material about the lower end and at least a portion of the peripheral sidewall of the floral holding material such that the open upper end of the floral holding material remains substantially uncovered by the sheet of material.

2. The decorative assembly of claim 1 wherein, in the step of positioning the band about the sheet of material, the band is automatically positioned about a portion of the sheet of material disposed about the peripheral sidewall of the floral holding material.

3. The decorative assembly of claim 1 wherein, in the step of positioning the band about the sheet of material, the band is automatically positioned about a portion of the sheet of material disposed above the open upper end of the shape sustaining floral holding material.

4. The decorative assembly of claim 1 wherein, in the step of positioning the band about the sheet of material, the band is positioned about a portion of the sheet of material disposed about the peripheral sidewall of the floral holding material.

5. The decorative assembly of claim 1 wherein, in the step of positioning the band about the sheet of material, the band is positioned about a portion of the sheet of material disposed above the open upper end of the shape sustaining floral holding material.

6. The decorative assembly of claim 1 wherein a portion of the stem portion of the floral grouping is disposed within the internal chamber of the shape sustaining floral holding material such that the bloom portion of the floral grouping extends above the open upper end of the shape sustaining floral holding material and wherein the portion of the stem portion of the floral grouping is disposed within the internal chamber of the shape sustaining floral holding material prior to forming the sheet of material about at least a portion of the peripheral sidewall of the floral holding material.

7. The decorative assembly of claim 1 wherein a portion of the stem portion of the floral grouping is disposed within the internal chamber of the shape sustaining floral holding material such that the bloom portion of the floral grouping extends above the open upper end of the shape sustaining floral holding material and wherein the portion of the stem portion of the floral grouping is disposed within the internal chamber of the shape sustaining floral holding material after positioning the band about the sheet of material.

8. A decorative assembly for supporting a floral grouping having a stem portion and a bloom portion, the decorative assembly comprising a shape sustaining floral holding material, a sheet of material and a band, the decorative assembly formed by a method comprising the steps of:

providing a shape sustaining floral holding material having an open upper end, a lower end and an outer peripheral surface, the floral holding material having a predetermined configuration and the floral holding material capable of maintaining its predetermined configuration as well as being capable of receiving and supporting a floral grouping;

providing a sheet of material;

providing a forming device adapted to form the sheet of material about the lower end and at least a portion of the outer peripheral surface of the floral holding material;

forming the sheet of material about the lower end and at least a portion of the outer peripheral surface of the floral holding material with the forming device whereby the sheet of material encompasses the lower end and at least a portion of the outer peripheral surface of the floral holding material while leaving the upper end of the floral holding material substantially uncovered;

providing a band; and positioning the band about the sheet of material while the sheet of material and the floral holding material are maintained within the forming device so as to secure the sheet of material about at least the lower end and at least a portion of the outer peripheral surface of the floral holding material such that the upper end of the floral holding material remains substantially uncovered by the sheet of material.

9. The decorative assembly of claim 8 wherein, in the step of positioning the band about the sheet of material, the band is automatically positioned about a portion of the sheet of material disposed about the lower end and the outer peripheral surface of the floral holding material.

10. The decorative assembly of claim 8 wherein, in the step of positioning the band about the sheet of material, the band is automatically positioned about a portion of the sheet of material disposed above the open upper end of the shape sustaining floral holding material.

11. The decorative assembly of claim 8 wherein, in the step of positioning the band about the sheet of material, the band is positioned about a portion of the sheet of material disposed about the outer peripheral surface of the floral holding material.

12. The decorative assembly of claim 8 wherein, in the step of positioning the band about the sheet of material, the band is positioned about a portion of the sheet of material disposed above the open upper end of the shape sustaining floral holding material.

13. The decorative assembly of claim 8 wherein a portion of the stem portion of the floral grouping is disposed in the floral holding material prior to forming the sheet of material about the lower end and at least a portion of the outer peripheral surface of the floral holding material.

14. The decorative assembly of claim 8 wherein a portion of the stem portion of the floral grouping is disposed in the floral holding material after positioning the band about the sheet of material.

15. A decorative assembly for supporting a floral grouping having a stem portion and a bloom portion, the decorative assembly comprising a shape sustaining floral holding material, a sheet of material and a band, the decorative assembly formed by a method comprising the steps of:

providing a shape sustaining floral holding material having an open upper end, a lower end and a peripheral sidewall defining an internal chamber extending between the open upper end and the lower end thereof, the floral holding material having a substantially conically-shaped predetermined configuration and the floral holding material capable of maintaining its predetermined configuration as well as being capable of receiving and supporting the floral grouping;

providing a sheet of material;

providing a forming device adapted to form the sheet of material about the lower end and at least a portion of the peripheral sidewall of the floral holding material, the forming device comprising a platform having an upper support surface and an opening extending through at least a portion of the upper support surface;

disposing the sheet of material upon the upper support surface of the forming device such that a portion of the sheet of material is disposed over the opening in the forming device;

moving the shape sustaining floral holding material into engagement with the sheet of material and through the opening in the forming device for forming the sheet of material about the lower end and at least a portion of the peripheral sidewall of the floral holding material while leaving the open upper end of the floral holding material substantially uncovered;

providing a band; and positioning the band about the sheet of material while the sheet of material and the floral holding material are maintained within the opening of the forming device so as to secure the sheet of material about the lower end and at least a portion of the peripheral sidewall of the floral holding material such that the open upper end of the floral holding material remains substantially uncovered by the sheet of material.

16. The decorative assembly of claim 15 wherein, in the step of positioning the band about the sheet of material, the band is automatically positioned about a portion of the sheet of material disposed about the peripheral sidewall of the floral holding material.

17. The decorative assembly of claim 15 wherein, in the step of positioning the band about the sheet of material, the band is automatically positioned about a portion of the sheet of material disposed above the open upper end of the shape sustaining floral holding material.

18. The decorative assembly of claim 15 wherein, in the step of positioning the band about the sheet of material, the band is positioned about a portion of the sheet of material disposed about the peripheral sidewall of the floral holding material.

19. The decorative assembly of claim 15 wherein, in the step of positioning the band about the sheet of material, the band is positioned about a portion of the sheet of material disposed above the open upper end of the shape sustaining floral holding material.

20. The decorative assembly of claim 15 wherein a portion of the stem portion of the floral grouping is disposed within the internal chamber of the shape sustaining floral holding material such that the bloom portion of the floral grouping extends above the open upper end of the shape sustaining floral holding material and wherein the portion of the stem portion of the floral grouping is disposed within the internal chamber of the shape sustaining floral holding material prior to forming the sheet of material about the lower end and at least a portion of the peripheral sidewall of the floral holding material.

21. The decorative assembly of claim 15 wherein a portion of the stem portion of the floral grouping is disposed within the internal chamber of the shape sustaining floral holding material such that the bloom portion of the floral grouping extends above the open upper end of the shape sustaining floral holding material and wherein the portion of the stem portion of the floral grouping is disposed within the internal chamber of the shape sustaining floral holding material after positioning the band about the sheet of material.

22. A decorative assembly for supporting a floral grouping having a stem portion and a bloom portion, the decorative assembly comprising a shape sustaining floral holding material, a sheet of material and a band, the decorative assembly formed by a method comprising the steps of:

providing a shape sustaining floral holding material having an open upper end, a lower end and an outer peripheral surface, the floral holding material having a predetermined configuration and the floral holding material capable of maintaining its predetermined configuration as well as being capable of receiving and supporting a floral grouping;

providing a sheet of material;

providing a forming device adapted to form the sheet of material about the lower end and at least a portion of the outer peripheral surface of the floral holding material, the forming device comprising a platform having an upper support surface and an opening extending through at least a portion of the upper support surface;

disposing the sheet of material upon the upper support surface of the forming device such that a portion of the sheet of material is disposed over the opening in the forming device;

moving the shape sustaining floral holding material into engagement with the sheet of material and through the opening in the forming device for forming the sheet of material about the lower end and at least a portion of the outer peripheral surface of the floral holding material while leaving the open upper end of the floral holding material substantially uncovered;

providing a band; and positioning the band about the sheet of material while the sheet of material and the floral holding material are maintained within the opening of the forming device so as to secure the sheet of material about the lower end and at least a portion of the outer peripheral surface of the floral holding material such that the open upper end of the floral holding material remains substantially uncovered by the sheet of material.

23. The decorative assembly of claim 22 wherein, in the step of positioning the band about the sheet of material, the band is automatically positioned about a portion of the sheet of material disposed about the outer peripheral surface of the floral holding material.

24. The decorative assembly of claim 22 wherein, in the step of positioning the band about the sheet of material, the band is automatically positioned about a portion of the sheet of material disposed above the open upper end of the shape sustaining floral holding material.

25. The decorative assembly of claim 22 wherein, in the step of positioning the band about the sheet of material, the band is positioned about a portion of the sheet of material disposed about the outer peripheral surface of the floral holding material.

26. The decorative assembly of claim 22 wherein, in the step of positioning the band about the sheet of material, the band is positioned about a portion of the sheet of material disposed above the open upper end of the shape sustaining floral holding material.

27. The decorative assembly of claim 22 wherein a portion of the stem portion of the floral grouping is disposed within the shape sustaining floral holding material such that the bloom portion of the floral grouping extends upwardly therefrom and wherein the portion of the stem portion of the floral grouping is disposed within the shape sustaining floral holding material prior to forming the sheet of material about at least a portion of the peripheral sidewall of the floral holding material.

28. The decorative assembly of claim 22 wherein a portion of the stem portion of the floral grouping is disposed within the shape sustaining floral holding material such that the bloom portion of the floral grouping extends upwardly therefrom and wherein the portion of the stem portion of the floral grouping is disposed within the shape sustaining floral holding material after positioning the band about the sheet of material.

* * * * *